United States Patent
Cheng et al.

(10) Patent No.: US 9,474,939 B2
(45) Date of Patent: Oct. 25, 2016

(54) SYSTEM AND METHOD FOR MAKING A GOLF BALL WITH ONE OR MORE PATTERNED FILM LAYERS

(75) Inventors: Chia-Chyi Cheng, Portland, OR (US); Bradley C. Tutmark, Aloha, OR (US)

(73) Assignee: NIKE, Inc., Beaverton, OR (US)

(*) Notice: Subject to any disclaimer, the term of this patent is extended or adjusted under 35 U.S.C. 154(b) by 1244 days.

(21) Appl. No.: 13/338,138

(22) Filed: Dec. 27, 2011

(65) Prior Publication Data
US 2013/0165272 A1 Jun. 27, 2013

(51) Int. Cl.
| A63B 37/12 | (2006.01) |
| A63B 37/00 | (2006.01) |
| A63B 45/00 | (2006.01) |
| B29C 49/46 | (2006.01) |
| B29C 63/22 | (2006.01) |
| B29L 31/54 | (2006.01) |
| B29C 63/48 | (2006.01) |

(52) U.S. Cl.
CPC ....... *A63B 37/0004* (2013.01); *A63B 37/0003* (2013.01); *A63B 37/0022* (2013.01); *A63B 37/0074* (2013.01); *A63B 37/0092* (2013.01); *A63B 45/00* (2013.01); *B29C 49/46* (2013.01); *B29C 63/22* (2013.01); *B29C 2063/485* (2013.01); *B29L 2031/546* (2013.01)

(58) Field of Classification Search
CPC ............................ A63B 37/0022; A63B 45/02
USPC .......................................................... 473/378
See application file for complete search history.

(56) References Cited

U.S. PATENT DOCUMENTS

| 4,614,340 | A |   | 9/1986  | Hosoya |
| 5,165,965 | A |   | 11/1992 | Martin |
| 5,503,699 | A | * | 4/1996  | Ratner ................... A63B 41/08 156/156 |
| 5,651,741 | A | * | 7/1997  | Masutani et al. ............. 473/200 |
| 5,762,573 | A | * | 6/1998  | Kennedy et al. ............. 473/570 |
| 5,836,833 | A |   | 11/1998 | Shimosaka et al. |
| 5,984,812 | A |   | 11/1999 | Sassak |
| 6,132,544 | A | * | 10/2000 | Ihara ............................. 156/146 |
| 6,217,463 | B1 |  | 4/2001  | Maruko et al. |
| 6,503,155 | B2 |  | 1/2003  | Maruko et al. |
| 2007/0149319 | A1 | * | 6/2007 | Ohira ............................. 473/351 |

FOREIGN PATENT DOCUMENTS

| JP | 08191909   | 7/1996  |
| JP | 2005152599 | 6/2005  |
| JP | 2009240708 | 10/2009 |

* cited by examiner

*Primary Examiner* — Raeann Gorden
(74) *Attorney, Agent, or Firm* — Honigman Miller Schwartz and Cohn LLP

(57) ABSTRACT

A system and method for manufacturing a golf ball with one or more patterned film layers is disclosed. The system and method may involve creating a patterned film layer and applying the patterned film layer to the surface of a golf ball. The patterned film layer may include a layer of film having cutouts leaving the remaining portions of film in a pattern. The pattern may include a net pattern. The patterned film layer may include a material that is relatively harder or relatively softer than the surface of the golf ball. The method may include removing portions of film from a film material to create a patterned film material, cutting the patterned film material into sheets, molding two patterned film sheets into substantially hemispherical cups, and applying the two substantially hemispherical cups to a golf ball.

23 Claims, 6 Drawing Sheets

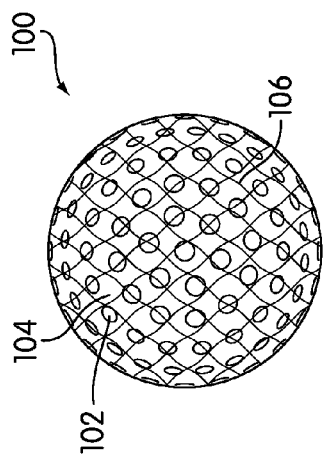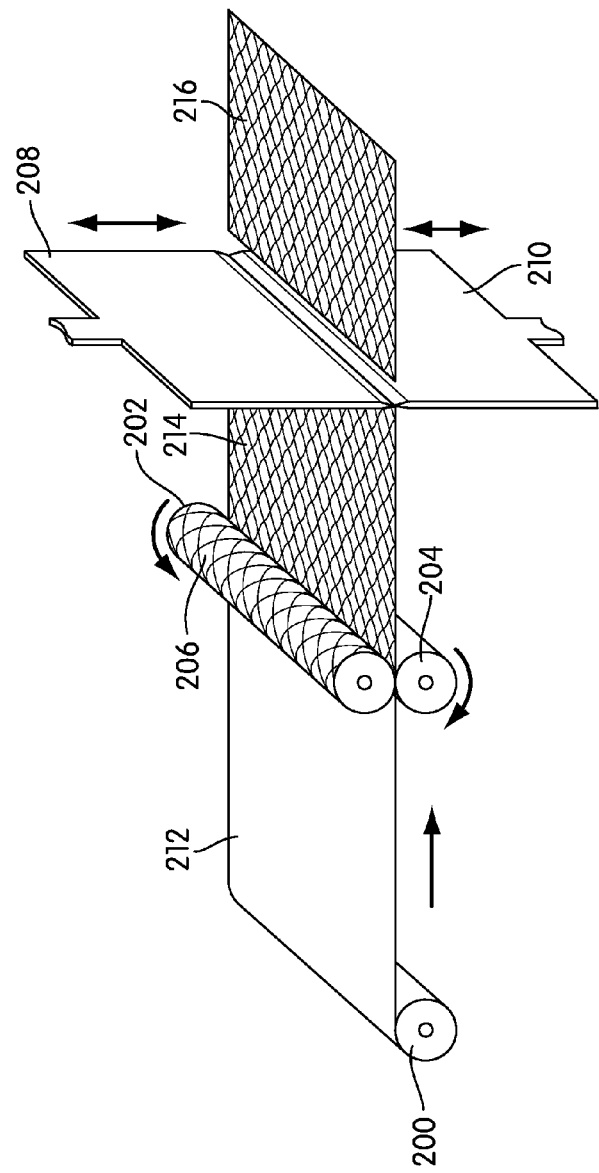

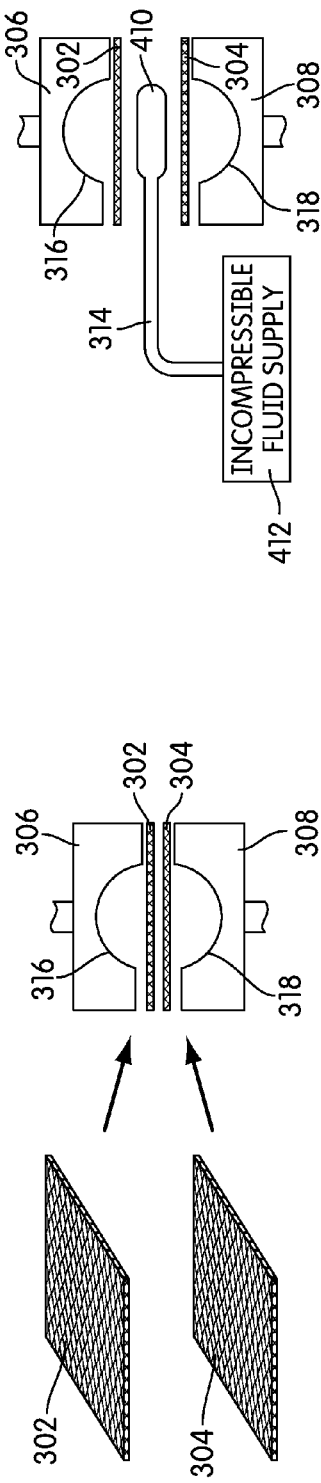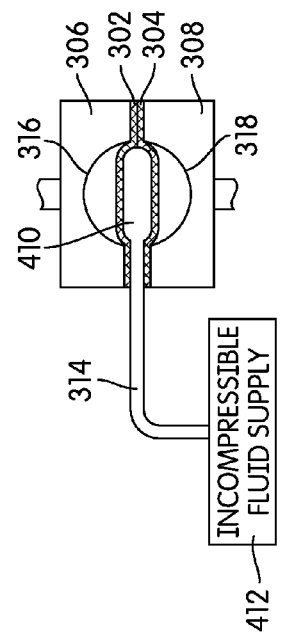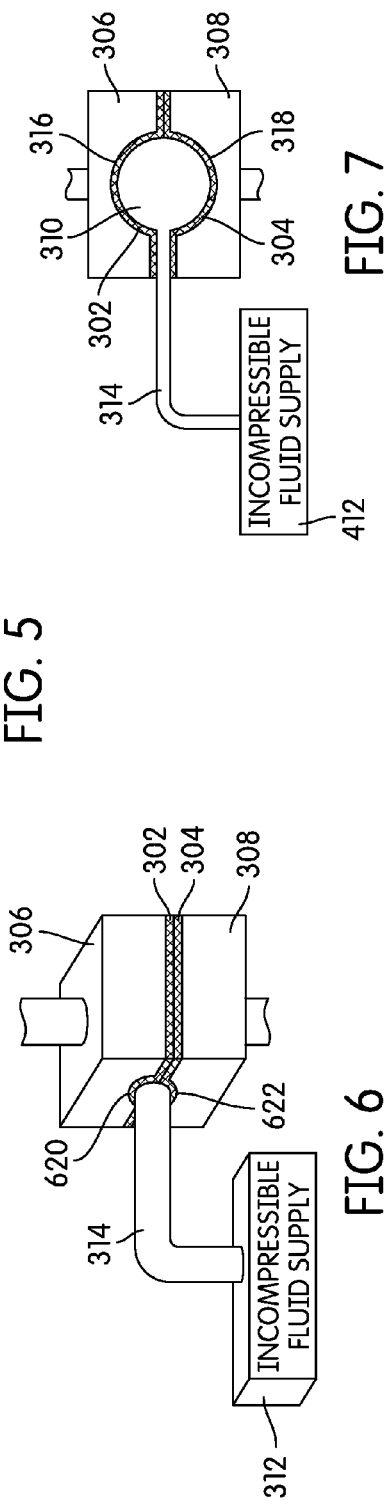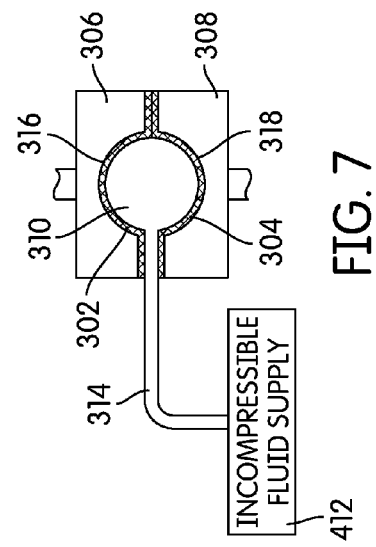

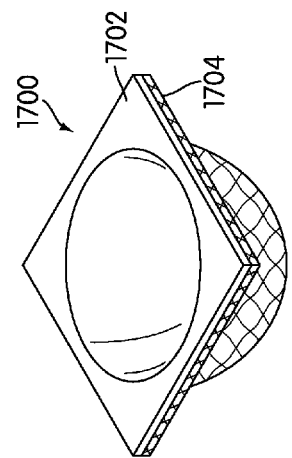
FIG. 17
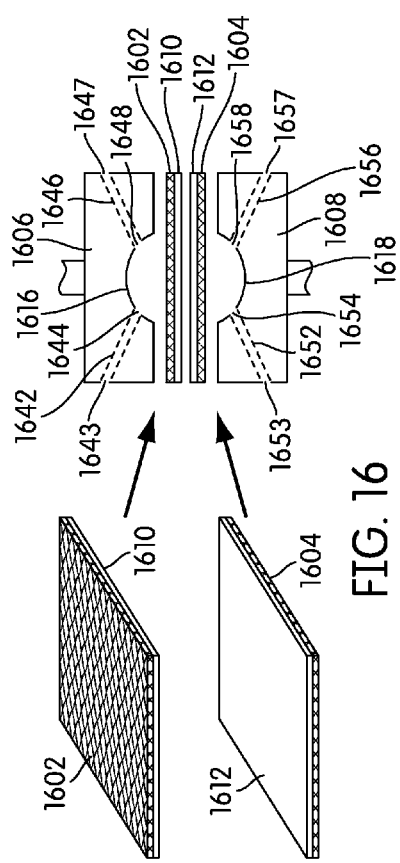
FIG. 16
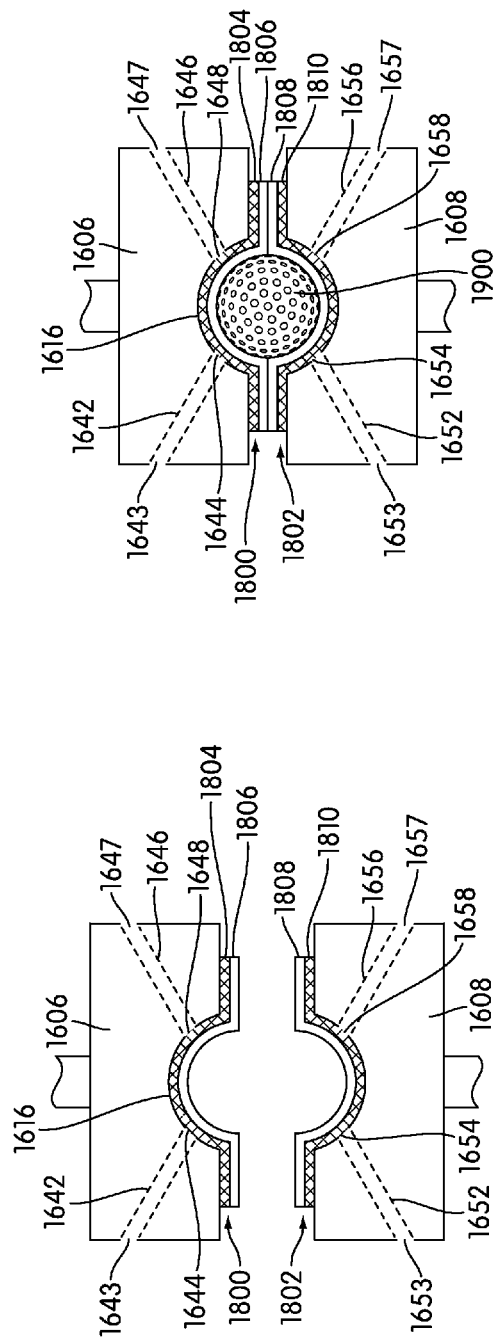
FIG. 19
FIG. 18

SYSTEM AND METHOD FOR MAKING A GOLF BALL WITH ONE OR MORE PATTERNED FILM LAYERS

BACKGROUND

The present invention relates generally to a system and method for manufacturing the golf ball. In particular, the system and method relates making a golf ball with one or more patterned film layers.

The game of golf is an increasingly popular sport at both the amateur and professional levels. A wide range of technologies related to the manufacture and design of golf balls are known in the art. Such technologies have resulted in golf balls with a variety of play characteristics. For example, different golf balls are manufactured and marketed to players having different golfing abilities, such as different swing speeds.

Similarly, a golfer may use different golf balls having different play characteristics depending on the golfer's preferences. For example, different dimple patterns may affect the aerodynamic properties of the golf ball during flight, or a difference in the hardness of the cover layer may affect the rate of backspin. With regard to hardness in particular, a golfer may choose to use a golf ball having a cover layer and/or a core that is harder or softer. A golf ball with a harder cover layer will generally achieve reduced driver spin, and achieve greater distances. However, a harder cover layer will generally cause a lower rate of spin, such that the golf ball will be better for drives but more difficult to control on shorter shots. On the other hand, a golf ball with a softer cover will generally experience more spin and therefore be easier to control and stop on the green, but will lack distance off the tee.

A wide range of golf balls having a variety of hardness characteristics are known in the art. Generally, the hardness of a golf ball is determined by the chemical composition and physical arrangement of the various layers making up the golf ball. Accordingly, a number of different golf ball materials are mixed and matched in various combinations and arrangements to create golf balls having different hardness values and different hardness profiles.

However, designing golf balls to achieve desired hardness characteristics suffers from at least several difficulties. Generally, the construction of known golf balls requires that a wide range of design variables such as layer arrangement, materials used in each layer, and layer thickness be balanced against each other. Changes to any of these variables may therefore improve a desired hardness only at the expense of other play characteristics. Additionally, materials costs and design costs associated with known golf ball constructions may unduly increase the cost of the golf ball to the end consumer. Perhaps most importantly, known golf balls generally cannot simultaneously achieve the advantageous play characteristics associated with high cover hardness (greater distances) while also achieving the advantageous play characteristics associated with low cover hardness (greater spin).

Therefore, there is a need in the art for a system and method that addresses the shortcomings of the prior art discussed above.

SUMMARY

A system and method for manufacturing a golf ball with one or more patterned film layers is disclosed. The system and method may involve creating a patterned film layer and applying the patterned film layer to the surface of a golf ball. The patterned film layer may include a layer of film having cutouts leaving the remaining portions of film. The pattern may include a net pattern. The patterned film layer may include a material that is relatively harder or relatively softer than the surface of the golf ball. The method may include removing portions of film from a film material to create a patterned film material, cutting the patterned film material into sheets, molding two patterned film sheets into substantially hemispherical cups, and applying the two substantially hemispherical cups to a golf ball.

In one aspect, the present disclosure provides a method of manufacturing a golf ball with a patterned layer. The method may include forming a pattern on a film material by removing portions of film from the film material in a pattern, molding the film material into substantially hemispherical cups, and applying the substantially hemispherical cups to the outer surface of a golf ball. The portions of film may be removed with a die cutter. The film material may be fed through a rotary a die cutter. Sheets may be cut from the film material. The sheets of film material may be positioned between mold halves. A bladder may be positioned between the sheets of film material while the sheets of film material are positioned between the mold halves. The film material may be molded into substantially hemispherical cups by pressing the mold halves together and inflating the bladder between the sheets of film material so that the bladder presses the sheets against mold portions of the mold halves. The substantially hemispherical cups may be applied to the outer surface of a golf ball by positioning the substantially hemispherical cups into mold halves and pressing a golf ball between the mold halves.

In one aspect, the present disclosure provides a method of manufacturing a golf ball with a patterned layer. The method may include forming a pattern on a film material by removing portions of film from the film material in a pattern. The film material may be molded into substantially hemispherical cups by placing film material between a first set of mold halves. The substantially hemispherical cups may be applied to the outer surface of a golf ball. The first set of mold halves may be heated. Adhesive may be disposed between the substantially hemispherical cups and the outer surface of the golf ball. The substantially hemispherical cups may be applied to the outer surface of the golf ball by positioning the substantially hemispherical cups into a second set of mold halves, positioning the golf ball between the substantially hemispherical cups, and pressing the second set of mold halves together. The second set of mold halves may be heated. The film material may be unrolled from a roll of film material. Sheets of film material may be cut.

In one aspect, the present disclosure provides a method of manufacturing a golf ball with a patterned layer. The method includes forming a pattern on a film material by removing portions of film from the film material in a pattern, molding the film material into substantially hemispherical cups by placing film material between a first set of mold halves, pressing the first set of mold halves together, and inflating a bladder between the first set of mold halves, and applying the substantially hemispherical cups to the outer surface of a golf ball. Portions of film may be removed with a die cutter. The film material may be fed through a rotary die cutter. The substantially hemispherical cups may be applied to the outer surface of the golf ball by positioning the substantially hemispherical cups into a second set of mold halves, positioning the golf ball between the substantially hemispherical cups, and pressing the second set of mold halves together. The first set of mold halves and the second set of mold halves may include substantially hemispherical shapes.

In one aspect, the present disclosure provides a golf ball having a core, a cover layer, and a patterned film layer. The cover layer may substantially surround the core and may include a plurality of dimples and at least one land area separating the dimples. The patterned film layer may substantially surround the cover layer. The cover layer may have a first hardness and the patterned film layer may have a second hardness different from the first hardness. The first hardness may be harder than the second hardness. The first hardness may be softer than the second hardness. The patterned film layer may cover substantially all of the plurality of dimples. The patterned film layer may cover substantially all of the land area. The patterned film layer may include a net pattern defined by cutout portions. A solid film layer may substantially surround the patterned film layer.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 1 is an exemplary embodiment of a golf ball having a patterned layer;

FIG. 2 illustrates a method of creating patterned sheets of film material, according to an exemplary embodiment;

FIG. 3 illustrates patterned sheets being positioned between mold halves, according to an exemplary embodiment;

FIG. 4 illustrates a deflated bladder being positioned between the patterned sheets and mold halves of FIG. 3, according to an exemplary embodiment;

FIG. 5 illustrates the mold halves of FIG. 4 being pressed together, according to an exemplary embodiment;

FIG. 6 is a perspective view of the mold halves of FIG. 4 being pressed together, according to an exemplary embodiment;

FIG. 7 illustrates the bladder of FIGS. 3-5 being inflated;

FIG. 16 shows patterned sheets affixed with solid film sheets being positioned between mold halves according to an exemplary embodiment;

FIG. 17 shows a hemispherical cup molded according to the exemplary embodiment of FIGS. 16-19;

FIG. 18 shows hemispherical cups of FIG. 17 in first and second mold halves;

FIG. 19 shows the mold halves of FIG. 18 being pressed together;

DETAILED DESCRIPTION

Figure 9:
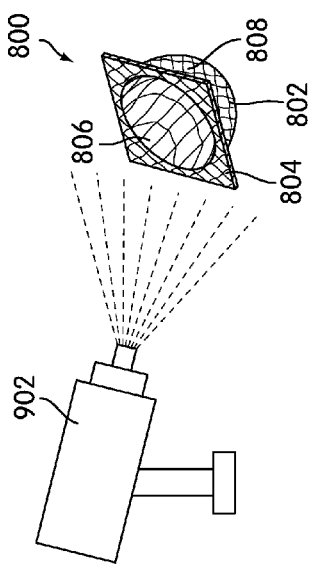
FIG. 9 shows the hemispherical cup of FIG. 8 being sprayed with adhesive, according to an exemplary embodiment.

A system and method for manufacturing a golf ball with one or more patterned film layers is disclosed. The system and method may involve creating a patterned film layer and applying the patterned film layer to the surface of a golf ball. The patterned film layer may include a layer of film having cutouts leaving the remaining portions of film in a pattern. For example, the pattern may include a net pattern or a pattern of holes corresponding to the dimples of a golf ball. The patterned film layer may include a material that has a different hardness from the golf ball cover material, i.e., is relatively harder or relatively softer than the cover material of the golf ball. Thus, applying the patterned film layer to the surface of a golf ball may result in the surface of the golf ball being relatively harder or softer wherever the patterned film layer is disposed. Consequently, the golf ball may have areas that are relatively harder and areas that are relatively softer. In other words, the patterned film layer may create a pattern of relative hardness on the surface of the golf ball. This patterned hardness may enhance the properties of the golf ball. For example, the patterned hardness may add strength to the golf ball or improve spinnability.

FIG. 1 shows a golf ball manufactured by an exemplary embodiment of the method. Golf ball 100 is made up of a cover layer having thereon a plurality of dimples 102 and at least one land area 104. Golf ball 100 may generally be any type of golf ball having a core and a cover layer substantially surrounding the core. For example, golf ball 100 may be of a two-piece construction, having only a core and a cover layer, or golf ball 100 may have one or more intermediate layers located between the core and the cover layer. Except as otherwise herein discussed, each layer of golf ball 100 may be formed of any material or construction as is generally known in the art of golf ball manufacturing. For example, various layers of golf ball 100 may be comprised of rubber, rubber composites, thermoplastic polyurethane, highly-neutralized polymers, ionomers, and other polymer materials known in the art of golf ball manufacturing.

Dimples 102 may generally be arranged on the cover layer in any pattern, as may be known in the art of golf balls. Various known dimple packing patterns are known in the art. Dimples 102 may generally be of any shape, such as circular, triangular, or multi-sided. Dimples 102 may be of uniform shape and size, or the dimple pattern may be made up of two or more different types of dimples having (for example) different sizes or different shapes. At least one land area 104 is a part of the cover layer that separates at least two dimples 102 and that is not indented or otherwise part of a dimple. Generally, land area 104 is the "ridge" or "fret" between adjoining dimples 102. Golf ball 100 may include one continuous land area 104 across the entire cover layer, as is shown in FIG. 1, or a plurality of separate land areas between dimples 102.

Golf ball 100 may include a patterned film layer 106. The pattern may include any known pattern. For example, as shown in FIG. 1, the pattern may include a net pattern. In some embodiments, the pattern may be selected based on a variety of factors. For example, the pattern may be selected based on desired play characteristics of the golf ball, such as improving spin by softening the frets while leaving the aerodynamics of the dimples unaffected.

The method of manufacturing a golf ball with a patterned film layer may generally include: removing portions of film from a film material to create a patterned film material; cutting the patterned film material into sheets; molding the two patterned film sheets into hemispherical cups; and applying the two hemispherical cups to a golf ball. The method of manufacturing a golf ball may further include the methods disclosed in U.S. Patent Application No. 61/578, 347 (Biaxial Film, filed Dec 21, 2011, the entirety of which is hereby incorporated by reference.

In some embodiments, patterned film layer 106 may be made from a layer of film initially having no pattern. For example, as shown in FIG. 2, a roll 200 of film material 212 may be provided. In some embodiments, film material 212 may include a polymeric material. For example, film material 212 may include thermoplastic material. In some embodiments, the thickness of the film material 212 may vary. In some embodiments, film material 212 may be within a range of $3/1000$ inches to $20/1000$ inches. In some embodiments, film material 212 may be within a range of $5/1000$ inches to $36/1000$ inches. In some embodiments, film material 212 may be within a range of $10/1000$ inches to $40/1000$ inches. In some embodiments, film material 212 may be treated prior to the pattern being formed. For example, film material 212 may be treated with chemicals, heated, or stretched. In some embodiments, film material 212 may be provided in sheets instead of a roll.

The pattern may be made by removing portions of film from film material 212. In some embodiments, the portions of film may be removed by laser cutting processes. In some embodiments, the portions of film may be removed by die cutting processes. For example, the method may include flatbed die cutting. As shown in FIG. 2, the method may include rotary die cutting. The system may include provisions for removing portions of film from film material 212. For example, to accomplish rotary die cutting, the system may include a die cut cylinder 202 and an anvil roller 204. Die cut cylinder 202 may include die portions 206 corresponding to the pattern being cut into film material 212. Die portions 206 may be configured to cut out portions of film material 212 in a pattern. FIG. 2 illustrates an embodiment in which die portions 206 may be configured to cut out portions of film material 212 in a net pattern. Anvil roller 204 may be disposed so that it engages with die portions 206 during the cutting process. For example, as shown in FIG. 2, anvil roller 204 may be disposed opposite die cut cylinder 202.

The pattern created on film material 212 may include any suitable pattern. Thus, in some embodiments, die portions 206 may be configured to cut out portions of film material 212 in patterns other than net patterns. For example, die portions 206 may be configured to cut out circular holes corresponding to the dimples of a golf ball. Consequently, after applying such a patterned sheet to a golf ball, the cutout portions of the patterned film may be aligned with the dimples.

The golf ball applied with this patterned film may include a film material applied only to the land areas, leaving the dimples of the golf ball exposed by cutouts provided in the patterned film. The pattern created on film material 212 and/or the orientation of the pattern may be selected according to a variety of factors. For example, the pattern and/or orientation may be selected based upon the angle of the club face and/or the impact force of the club to be used with the ball including the patterned film layer. In some embodiments, the pattern may be selected based upon how the pattern compensates for the distortion caused by the process of shaping the film material into hemispherical cups. For example, the selected pattern may be smaller is regions that will be stretched during the shaping the film material into hemispherical cups. Known processes may be used to adjust a pattern to distort so that the pattern appears properly once it is stretched. For example, a pattern may be adjusted according to the methods disclosed in U.S. Pat. No. 5,165, 965 to Martin ("Martin"), entitled "Method for Providing Predistorted Images on Shrinkable Film," issued on Nov. 24, 1992, the entirety of which is hereby incorporated by reference. This patent discloses a method of making dimensions of an image bigger before shrink wrapping the image onto a bottle. The larger dimensions compensate for the portions of the pattern that shrink during the shrink wrapping process. Similar to making dimensions of a pattern larger to compensate for shrinking, dimensions of the pattern may be made smaller to compensate for stretching.

In some embodiments, the method of cutting the pattern into film material 212 may include unrolling film material 212 from roll 200. In some embodiments, the system may include provisions for unrolling the film material 212 from roll 200. For example, the system may include a conveyor belt or a robotic arm to unroll film material 212 from roll 200. In some embodiments, a human may manually unroll film material 212 from roll 200. In some embodiments, the method may include feeding film material 212 between die cut cylinder 202 and anvil roller 204. In some embodiments, the system may include provisions for feeding film material 212 between die cut cylinder 202 and anvil roller 204. For example, the system may include a conveyor belt or a robotic arm for feeding film material 212 between die cut cylinder 202 and anvil roller 204. In some embodiments, a human may manually feed film material 212 between die cut cylinder 202 and anvil roller 204. In some embodiments, the method may include unrolling film material 212 from roll 200 as film material 212 is being fed between die cut cylinder 202 and anvil roller 204. When film material 212 is fed between die cut cylinder 202 and anvil roller 204, film material 212 may be pressed between die cut cylinder 202 and anvil roller 204 so that die portions 206 may cut out portions of film material 212, creating patterned film material 214. As film material 212 is fed between die cut cylinder 202 and anvil roller 204, die cut cylinder 202 and anvil roller 204 may rotate at the same rate film material 212 is being fed. As a result, die portions 206 may cut a continuous pattern into film material 212. In some embodiments, die cut cylinder 202 and anvil roller 204 may feed through film material 212 with their rotational motion.

In some embodiments, the method may include cutting patterned film material 214 into patterned sheets 216. Accordingly, in some embodiments, the system may include provisions for cutting patterned film material 214 into patterned sheets 216. For example, the system may include a first blade 208 and a second blade 210 opposite first blade 208. In some embodiments, first blade 208 may be moved toward second blade 210 to cut patterned film material 214 with a shearing action. In some embodiments, second blade 210 may be moved toward first blade 208 to cut patterned film material 214 with a shearing action. In some embodiments, first blade 208 and second blade 210 may be moved toward each other to cut patterned film material 214 with a shearing action. In some embodiments, other types of cutting devices and cutting methods may be used to cut patterned film material 214 into patterned sheets 216. For example, a second die cut roller and a second anvil may be used to cut patterned film material 214 into patterned sheets 216. In some embodiments, film material 212 may be cut prior to creating the pattern.

In some embodiments, patterned film material 214 may be stretched prior to application to a golf ball. For example, patterned film material 214 may be stretched according to the methods disclosed in U.S. Patent Application No. 61/578,347 (Biaxial Film), filed Dec. 21, 2011, the entirety of which is hereby incorporated by reference. In embodiments in which patterned film material 214 is stretched, the pattern on patterned film material 214 may be distorted by the stretching process. For example, the initial pattern may be cut into film material 212 may be distorted into a new pattern after patterned film material 214 is stretched. In some embodiments, the initial pattern cut into the film material may be selected to result in a new pattern after the patterned film material has been stretched. In some embodiments, the method of stretching the film material may be selected to manipulate the pattern cut into the film material to arrive at a new pattern after the patterned film material has been stretched.

FIGS. 3-8 disclose a method of making patterned sheets into hemispherical cups, according to an exemplary embodiment. As is known in the art, it is virtually impossible to produce a perfectly hemispherical cup. Accordingly, it is understood that a hemispherical cup may include a cup being shaped hemispherically to standard manufacturing tolerances.

Referring back to FIGS. 3-8, the system may include a first mold half 306 and a second mold half 308. First mold half 306 may include a first mold portion 316 corresponding to the hemispherical shape of half of a golf ball. In some embodiments, first mold portion 316 may include protrusions corresponding to the dimples of a golf ball. Second mold half 308 may include a second mold portion 318 corresponding to the hemispherical shape of half of a golf ball. In some embodiments, second mold portion 318 may include protrusions corresponding to the dimples of a golf ball. FIG. 3 illustrates how a first patterned sheet 302 and a second patterned sheet 304 may be positioned between first mold half 306 and second mold half 308. In some embodiments, first patterned sheet 302 may be particularly oriented with respect to first mold portion 316 and second patterned sheet 304 may be particularly oriented with respect to second mold portion 318. The orientation of the patterned sheets may be determined based on a variety of factors. For example, the orientation may be based on the pattern of the patterned sheets and how the pattern will be lined up with the dimples of the golf ball after application to the golf ball. In some embodiments, the system may include provisions for automatically orienting the patterned sheets. For example, a laser sensor or a visual sensor may be used to align the patterned sheets within first mold half 306 and second mold half. In another example, a human may visually inspect and orient the patterned sheets.

In some embodiments, additional patterned sheets may be positioned between first mold half 306 and second mold half 308 to simultaneously mold multiple patterned layers. For example, four patterned sheets may be positioned between first mold half 306 and second mold half 308. In another example, ten patterned sheets may be positioned between first mold half 306 and second mold half 308. In some embodiments, release film may be provided between the patterned sheets to prevent the patterned sheets from sticking to one another. In some embodiments, the additional patterned sheets may include the same or different patterns as first patterned sheet 302 and second patterned sheet 304. In some embodiments, the additional patterned sheets may include the same or different materials as first patterned sheet 302 and second patterned sheet 304. In some embodiments, first mold half 304 and second mold half 306 may include multiple mold portions to mold multiple hemispherical cup shapes simultaneously. Such a formation may allow multiple golf balls to be coated simultaneously. As discussed in further detail below with respect to FIGS. 16-21, plain sheets without patterns may be molded with patterned sheets.

FIG. 4 illustrates a deflated bladder 410 being placed between first sheet 302 and second sheet 304. Bladder 410 may be placed between first sheet 302 and second sheet 304 while the sheets are positioned between first mold half 306 and second mold half 308. Bladder 410 may be made of any material suitable for being inflated. For example, bladder 410 may be made of mylar, latex, or rubber. Bladder 410 may be in fluid communication with an incompressible fluid supply 412. For example, as shown in FIG. 4, a tube 314 may connect the incompressible fluid supply 412 to bladder 410. The incompressible fluid may include a liquid or gas suitable for inflating bladder 410. For example, the incompressible fluid may include water, argon, or nitrogen.

FIG. 5 illustrates first mold half 306 and second mold half 308 being pressed together against first patterned sheet 302 and second patterned sheet 304, according to an exemplary embodiment. In some embodiments, first mold half 306 may be moved toward second mold half 308 to press the two mold halves together. In some embodiments, second mold half 308 may be moved toward first mold half 306 to press the two mold halves together. In some embodiments, first mold half 306 and second mold half 308 may be moved toward each other to press the two mold halves together. Pressing first mold half 306 and second mold half 308 together may result in bladder 410 being surrounded by the patterned sheets. While first mold half 306 and second mold half 308 are pressed together, first mold portion 316 and second mold portion 318 may together form a shape that is substantially similar to the shape of a golf ball.

FIG. 6 is a perspective view of first mold half 306 and second mold half 308 pressed together. First mold half 306 may include a first notch 620 and second mold half 308 may include a second notch 622. First notch 620 and second notch 622 may together create a tunnel when first mold half 306 and second mold half 308 are pressed together. The tunnel may be configured to receive tube 314. The tunnel may prevent tube 314 from being compressed, thus preserving fluid communication between incompressible fluid supply 412 and bladder 410. In some embodiments, tube 314 may have an outer diameter in the range of 250 microns to 6 mm. The diameter of the tunnel may correspond with the diameter of tube 314. Minimizing the size of tube 314 may minimize the interruption of contact between first mold half 306 and second mold half 308. Consequently, the shape of the hemispherical cups may be negligibly affected by tube 314. In some embodiments, to prevent the tube from interfering with patterned sheet, the tube may be aligned with a hole in the pattern.

FIG. 7 shows how bladder 410 may be inflated with incompressible fluid after first mold half 306 and second mold half 308 are pressed together. In some embodiments, bladder 410 may be inflated before first mold half 306 and second mold half 308 are pressed together. In some embodiments, bladder 410 may be inflated as first mold half 306 and second mold half 308 are being pressed together. Bladder 410 may be inflated until it presses first patterned sheet 302 against first mold portion 316 and second patterned sheet 304 against second mold portion 318. Once fully inflated, bladder 410 may have a size and shape substantially similar to the size and shape of a golf ball. As a result, bladder 410 may press and mold first patterned sheet 302 and second patterned sheet 304 into hemispherical cups having a size and shape substantially similar to the size and shape of a golf ball.

In some embodiments, heat may be applied to first patterned sheet 302 and second patterned sheet 304 before, during, or after inflation of bladder 410. In some embodiments, heat may be applied to first mold portion 316 and/or second mold portion 318 before, during, or after inflation of bladder 410. In some embodiments, the system may include provisions for heating the patterned sheets and/or the mold halves. For example, the system may include heating coils or other known heating devices within first mold half 306 and second mold half 308. In some embodiments, first mold half 306 and second mold half 308 may be pressed together in a heated environment. Applying heat may enhance molding of first patterned sheet 302 and second patterned sheet 304. The temperature of the heat applied may be sufficiently high to make the patterned sheets relatively malleable without losing the shape of the pattern or melting entirely. For example, in some embodiments, the heat may be within a range of 300° F. to 400° F. In some embodiments, the heat may be within a range of 400° F. to 500° F. The temperature of the heat applied may depend upon the type of materials used.

In some embodiments, as discussed below with respect to the embodiments shown in FIGS. 16-18, air may be suctioned out of the space disposed between first mold portion 316 and first patterned sheet 302 and the space disposed between second mold portion 318 and second patterned sheet 304 while bladder 410 is inflated. Removing air from the spaces disposed between the mold portions and the patterned sheets may prevent air from being trapped in these spaces. Removing trapped air may enhance the molding process because trapped air may interfere with the molding process. In some embodiments, the patterned sheets may be individually formed into hemispherical cup shapes by first mold half 306 and another mold half having a convex shape corresponding to first mold half 306. In such an embodiment, in place of inflating bladder 410, the convex mold shape may be used to press the patterned sheet into first mold half 306 to mold the patterned sheet into a hemispherical cup.

Figure 8:
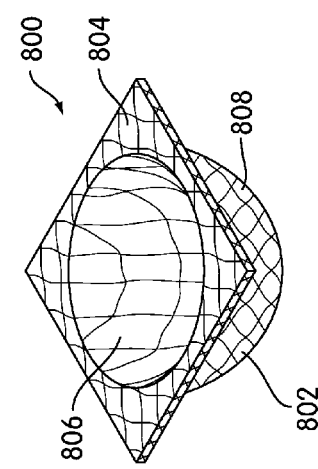
FIG. 8 is a hemispherical cup molded by the exemplary method shown in FIGS. 3-7.

FIG. 8 shows a hemispherical cup 800 molded by the exemplary method described with reference to FIGS. 3-7. Hemispherical cup 800 may have an inner surface 806 and an outer surface 808. Inner surface 806 may be applied to the surface of a golf ball. Hemispherical cup 800 may have a hemispherical cup-shaped portion 802 and a flange 804 extending radially from hemispherical cup-shaped portion 802. In some embodiments, flange 804 may be cut immediately after a patterned sheet has been molded into a hemispherical cup.

After the patterned sheets are molded into hemispherical cups, the hemispherical cups may be applied to a golf ball. Adhesive may be disposed between hemispherical cup 800 and a golf ball to attach hemispherical cup 800 to the golf ball. FIG. 9 illustrates how the adhesive may be applied to inner surface 806. In some embodiments, the adhesive may be applied to hemispherical cup 800 before applying hemispherical cup 800 to the surface of a golf ball. In some embodiments, the adhesive may be applied to outer surface 808 instead of or in addition to inner surface 806. Applying the adhesive to outer surface 808 may facilitate adhering multiple hemispherical cups together when creating a golf ball with multiple patterned layers. Applying the adhesive to outer surface 808 may prevent delamination between patterned layers in golf balls having multiple patterned layers. In some embodiments, the adhesive may be applied to the golf ball instead of or in addition to surface 806. The adhesive may be applied by any known method and the system may include provisions for applying the adhesive to the molded sheets. For example, as shown in FIG. 9, a spray gun 902 may spray the adhesive onto hemispherical cup 800. The adhesive may include any known adhesive. For example, the adhesive may include ethylene vinyl acetate. In another example, the adhesive may include a heat-activated adhesive. In some embodiments, the adhesive may include an adhesive film material that is disposed between the surfaces to be bonded.

Figure 10:
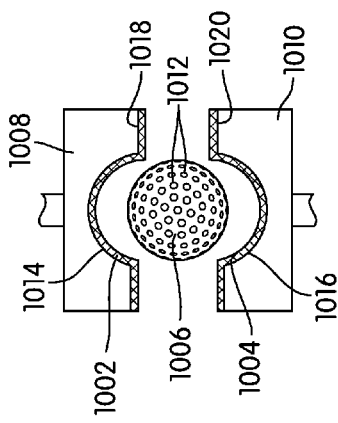
FIG. 10 illustrates hemispherical cups being placed in mold halves, according to an exemplary embodiment.
Figure 11:
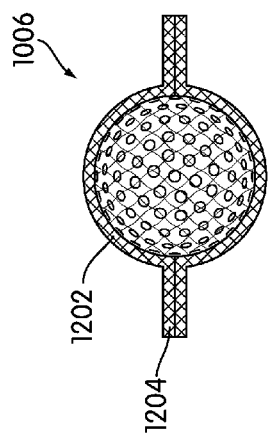
FIG. 11 illustrates the mold halves of FIG. 10 being pressed together, according to an exemplary embodiment.

FIGS. 10-11 illustrate a first hemispherical cup 1002 and a second hemispherical cup 1004 being applied to the outer coating a golf ball 1006. In some embodiments, as shown in FIG. 10, first hemispherical cup 1002 may be placed in a third mold half 1008 and second hemispherical cup 1004 may be placed in a fourth mold half 1010. Third mold half 1008 may include a third mold portion 1014 corresponding to the hemispherical shape of half of a golf ball. In some embodiments, third mold portion 1014 may include protrusions corresponding to the dimples of a golf ball. Fourth mold half 1010 may include a fourth mold portion 1016 corresponding to the hemispherical shape of half of a golf ball. In some embodiments, fourth mold portion 1016 may include protrusions corresponding to the dimples of a golf ball. In some embodiments, first hemispherical cup 1002 and second hemispherical cup 1004 may remain in the mold halves they were molded in. In some embodiments, after adhesive is applied to first hemispherical cup 1002 and second hemispherical cup 1004 and/or the flange is cut from first hemispherical cup 1002 and second hemispherical cup 1004, first hemispherical cup 1002 and second hemispherical cup 1004 may be placed in either new mold halves or the same mold halves they were molded. In some embodiments, third mold half 1008 and fourth mold half 1010 may include multiple mold portions to apply multiple hemispherical cups to multiple golf balls simultaneously. Such a formation may allow multiple golf balls to be coated simultaneously.

In some embodiments, first hemispherical cup 1002 may be particularly oriented with respect to third mold portion 1014 and second hemispherical cup 1004 may be particularly oriented with respect to fourth mold portion 1016. The orientation of first hemispherical cup 1002 and second hemispherical cup 1004 may be determined based on a variety of factors. For example, the orientation may be based on the pattern of first hemispherical cup 1002 and second hemispherical cup 1004 and how it will be lined up with the dimples 1012 golf ball 1006. In some embodiments, the system may include provisions for automatically orienting first hemispherical cup 1002 and second hemispherical cup 1004. For example, a laser sensor or a visual sensor may be used to align first hemispherical cup 1002 within third mold half 1008 and second hemispherical cup 1004 within fourth mold half 1010. In another example, a human may visually inspect and orient first hemispherical cup 1002 and second hemispherical cup 1004. In yet another example, the mold halves may be mechanically keyed to orient the hemispherical cups.

In some embodiments, golf ball 1006 may be particularly oriented with respect to third mold portion 1014 and/or fourth mold portion 1016. In some embodiments, golf ball 1006 may be particularly oriented with respect to first hemispherical cup 1002 and/or second hemispherical cup 1004. The orientation of golf ball 1006 may be determined based on a variety of factors. For example, the orientation may be based on the pattern of first hemispherical cup 1002 and second hemispherical cup 1004 and how it will be lined up with dimples 1012. In some embodiments, the system may include provisions for automatically placing golf ball 1006 into one or both of third mold half 1008 and second mold half 1010 with the correct orientation. For example, a laser sensor or a visual sensor may be used to align golf ball 1006 with one or both of third mold half 1008 and fourth mold half 1010 with the correct orientation. In another example, a human may visually inspect and orient golf ball 1006.

In some embodiments, additional hemispherical cups may be positioned between golf ball 1006 and third mold portion 1014 and between golf ball 1006 and fourth mold portion 1016. Additional hemispherical cups may be added to create a golf ball with multiple patterned layers. For example, one additional hemispherical cup may be positioned between golf ball 1006 and third mold portion 1014 and one additional hemispherical cup may be positioned between golf ball 1006 and fourth mold portion 1016 to create a golf ball with two patterned layers. In another example, five additional hemispherical cups may be positioned between golf ball 1006 and third mold portion 1014 and five additional hemispherical cups may be positioned between golf ball 1006 and fourth mold portion 1016 to create a golf ball with six patterned layers. In some embodiments, the additional hemispherical cups may include the same or different patterns as first hemispherical cup 1002 and second hemispherical cup 1004. In some embodiments, the additional patterned sheets may include the same or different materials as first hemispherical cup 1002 and second hemispherical cup 1004.

FIG. 11 illustrates how third mold half 1008 and fourth mold half 1010 may be pressed together to apply the hemispherical cups to golf ball 1006. In some embodiments, third mold half 1008 may be moved toward fourth mold half 1010 to press the two mold halves together. In some embodiments, fourth mold half 1010 may be moved toward third mold half 1008 to press the two mold halves together. In some embodiments, third mold half 1008 and fourth mold half 1010 may be moved toward each other to press the two mold halves together. The compressive forces applied to the hemispherical cups and golf ball 1006 by the mold halves facilitates bonding the hemispherical cups to the outer surface of golf ball 1006. In some embodiments, the flange 1018 of first hemispherical cup 1002 and the flange 1020 of second hemispherical cup 1004 may be fused together to form a ball flange. In some embodiments, flange 1018 and flange 1020 may be removed prior to application of the hemispherical cups to the outer surface of golf ball 1006. Accordingly, a ball flange may not be formed in those embodiments.

In some embodiments, heat may be applied to first hemispherical cup 1002 and second hemispherical cup 1004 before, during, or after third mold half 1008 and fourth mold half 1010 are pressed together. In some embodiments, heat may be applied to third mold portion 1014 and/or fourth mold portion 1016 before, during, or after third mold half 1008 and fourth mold half 1010 are pressed together. The temperature of the heat may be less than the melt temperature of the cover material of golf ball 1006 to ensure that the cover material does not melt and/or become deformed. In some embodiments, applying heat may activate an adhesive disposed between first hemispherical cup 1002 and golf ball 1006 and between second hemispherical cup 1004 and golf ball 1006. The temperature of the heat may be high enough to adhere first hemispherical cup 1002 and second hemispherical cup 1004 to golf ball 1006. For example, in embodiments in which a heat-activated adhesive has been disposed between golf ball 1006 and hemispherical cup 1002 and between golf ball 1006 and second hemispherical cup 1004, the temperature of the heat may be high enough to activate the adhesive. In some embodiments, applying heat may slightly melt first hemispherical cup 1002 and second hemispherical cup 1004 to facilitate bonding the hemispherical cups to golf ball 1006. In some embodiments, the temperature of the heat may be sufficiently high to make hemispherical cup 1002 and second hemispherical cup 1004 sufficiently melted to bond to the surface of golf ball. In some embodiments, the temperature of the heat may be within a range of 300° F. to 400° F. In some embodiments, the temperature of the heat may be within a range of 400° F. to 500° F. The temperature of the heat applied may depend upon the type of materials used.

In some embodiments, the system may include provisions for heating the hemispherical cups and/or the mold portions. For example, the system may include heating coils or other known heating devices within third mold half 1008 and fourth mold half 1010. In some embodiments, third mold half 1008 and fourth mold half 1010 may be pressed together in a heated environment.

Figure 12:
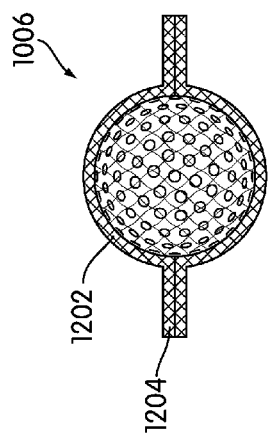
FIG. 12 shows a golf ball after hemispherical cups have been applied to the outer surface of the golf ball by the exemplary method illustrated in FIGS. 10-11 to form a patterned layer.
Figure 14:
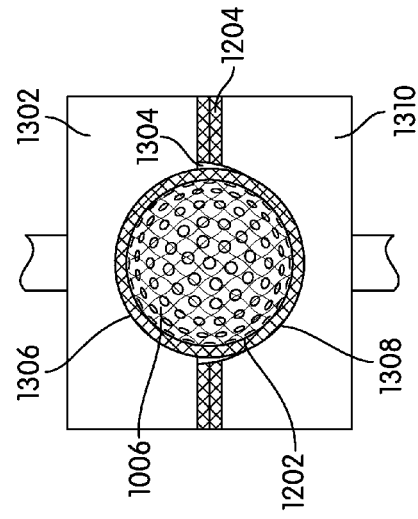
FIG. 14 illustrates the ball flange being cut by the mold halves of FIG. 13, according to an exemplary embodiment.
Figure 13:
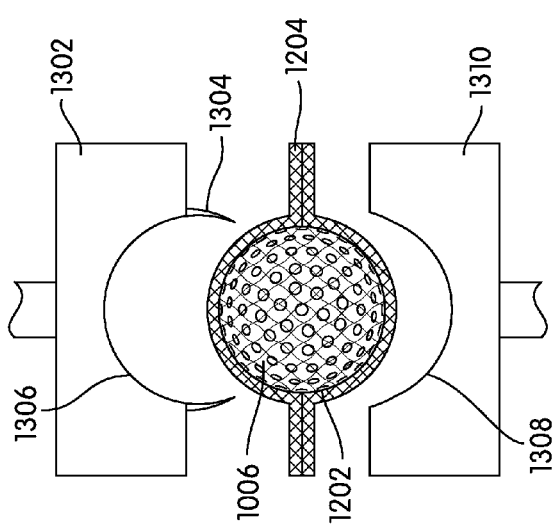
FIG. 13 illustrates the golf ball of FIG. 12 being placed between mold halves having a blade for trimming the ball flange, according to an exemplary embodiment.

FIG. 12 shows golf ball 1006 after first hemispherical cup 1002 and second hemispherical cup 1004 have been applied to the outer surface of golf ball 1006 by the exemplary method described with reference to FIGS. 10-11 to form a patterned layer 1202. Golf ball 1006 may include flashing 1204 formed by flange 1018 and flange 1020 being fused together. In some embodiments, flange 1018 and flange 1020 may be removed prior to application of the hemispherical cups to the outer surface of golf ball 1006. Accordingly, a ball flange may not be formed in those embodiments. In some embodiments, flashing 1204 may be trimmed prior to removing golf ball 1006 from third mold half 1008 and fourth mold half 1010 after first hemispherical cup 1002 and second hemispherical cup 1004 have been applied to the outer service of golf ball 1006. In some embodiments, the system may include provisions for trimming the flashing 1204 after first hemispherical cup 1002 and second hemispherical cup 1004 have been applied to the outer surface of golf ball 1006. For example, as shown in FIG. 13, a fifth mold half 1302 may include a blade 1304 disposed on a rim of a fifth mold portion 1306. Blade 1304 may be configured to be received by a sixth mold portion 1308 of a sixth mold half 1310. FIGS. 13-14 illustrate how blade 1304 may trim flashing 1204 from golf ball 1006 according to an exemplary embodiment. Golf ball 1006 may be placed between fifth mold half 1302 and sixth mold half 1308. Golf ball 1006 may be pressed between fifth mold half 1302 and sixth mold half 1308. Blade 1304 may cut through flashing 1204 as fifth mold half 1302 is pressed together with sixth mold half 1308. As a result, flashing 1204 is trimmed from golf ball 1006. In some embodiments, third mold half 1008 and fourth mold half 1010 may be configured to trim the flanges of first hemispherical cup 1002 and second hemispherical cup 1004 as first hemispherical cup 1002 and second hemispherical cup 1004 are bonded to golf ball 1006. In some embodiments, the flanges cut from hemispherical cups or golf balls having a patterned layer may be recycled and may be used to form another roll of film material.

Figure 15:
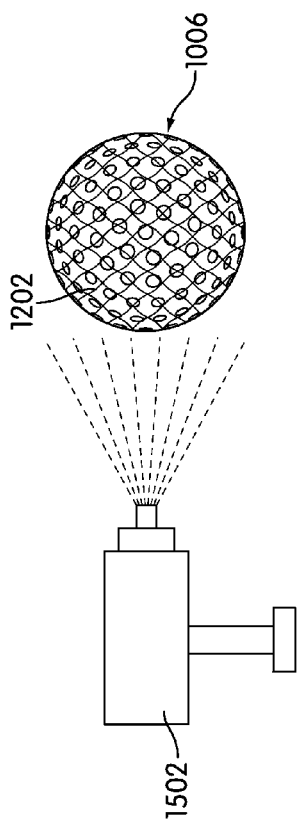
FIG. 15 illustrates the golf ball of FIG. 14 undergoing finishing work.

In some embodiments, golf ball 1006 may be ready for finishing work after patterned layer 1202 has been applied. For example, finishing work may include spraying golf ball 1006 with a coating. FIG. 15 illustrates how golf ball 1006 may be sprayed with a coating so that patterned layer 1202 and the surfaces of golf ball 1006 exposed by cutouts in patterned layer 1202 may coated. In some embodiments, the system may include provisions for coating golf ball 1006. For example, as shown in FIG. 15, the system may include a spray gun 1502 for spraying golf ball 1006 with a coating material. The coating material may include paint or other materials adding to the characteristics of the golf ball. In some embodiments, golf ball 1006 may be sprayed with a protective coating or a coating that imparts aerodynamic properties to the golf ball. In some embodiments, finishing work may include marking golf ball 1006 with a logo. In some embodiments, patterned layer 1202 may include a different color than the outer coating of golf ball 1006. In other embodiments, patterned layer 1202 may include the same color as the outer coating of golf ball 1006. In some embodiments, patterned layer may include a pattern of colors. In some embodiments, patterned layer 1202 may include a different texture than that of the outer coating of golf ball 1006. In some embodiments, patterned layer 1202 may include the same texture as that of the outer coating of golf ball 1006.

In some embodiments, the molds used to apply hemispherical cups to a golf ball may include provisions for applying positive and/or negative pressure to the golf ball components during the molding process. Applying positive and/or negative pressure may prevent wrinkles or air pockets from developing between the sheets and the bladder used to make hemispherical cups. Applying positive and/or negative pressure may aid in orienting the sheets in molds. Applying positive and/or negative pressure may enhance the application process by preventing wrinkles or air pockets from developing between the hemispherical cups and the outer surface of a golf ball. To prevent air from flowing through the holes in the patterned sheets, solid film sheets may be affixed to the patterned sheets during the process of making the patterned sheets into hemispherical cups. For example, as shown in FIG. 16, a first patterned sheet 1602 may be affixed to a first solid film sheet 1610 and a second patterned sheet 1604 may be affixed to a second solid film sheet 1612. In some embodiments, the patterned sheets may be affixed to the sold film sheets by adhesive.

FIGS. 16-19 illustrates an exemplary embodiment in which the molds used to make patterned sheets into hemispherical cups and/or to apply hemispherical cups to a golf ball may include provisions for applying positive and/or negative pressure to the golf ball components during the molding process. This embodiment may include a first mold half 1606 and a second mold half 1608. First mold half 1606 may include a first mold portion 1616 corresponding to the hemispherical shape of half of a golf ball. In some embodiments, first mold portion 1616 may include protrusions corresponding to the dimples of a golf ball. Second mold half 1608 may include a second mold portion 1618 corresponding to the hemispherical shape of half of a golf ball. In some embodiments, second mold portion 1618 may include protrusions corresponding to the dimples of a golf ball.

First mold half 1606 may include provisions for applying positive and/or negative pressure to the golf ball components during the molding process. Referring to FIG. 16, first mold half 1606 may include a first passage 1642 and a second passage 1646 capable of providing positive pressure and/or negative pressure (e.g., a vacuum). In other embodiments, first mold half 1606 may include any number of passages. After the first mold half 1606 and second mold half 1608 are brought together, positive pressure and/or negative pressure may be provided at an outer end 1648 of first passage 1642 and at an outer end 1647 of second passage 1646. In some embodiments, outer end 1648 of first passage 1642 may be located on an exterior surface of first mold half 1606, while an inner end 1644 may be located on first mold portion 1616. In some embodiments, outer end 1647 of second passage 1646 may be located on the exterior surface of first mold half 1606, while an inner end 1648 may be located on first mold portion 1616. Providing positive pressure and/or negative pressure at outer end 1648 of first passage 1642 and at outer end 1647 of second passage 1646 may result in a positive pressure and/or negative pressure at inner end 1644 of first passage 1642 and inner end 1648 of second passage 1646.

In some embodiments, second mold half 1608 may include provisions to apply positive and/or negative pressure to the golf ball components during the molding process. Referring to FIG. 16, second mold half 1608 may include a third passage 1652 and a fourth passage 1656 capable of providing positive pressure and/or vacuum pressure. In other embodiments, second mold half 1608 may include any number of passages. After first mold half 1606 and second mold half 1608 are brought together, a positive pressure and/or negative pressure may be provided at an outer end 1653 of third passage 1652 and at an outer end 1657 of fourth passage 1656. In some embodiments, outer end 1653 of third passage 1652 may be located on an exterior surface 1638 of second mold half 1608, while an inner end 1654 may be located on second mold portion 1618. In some embodiments, outer end 1657 of fourth passage 1656 may be located on the exterior surface 1639 of second mold half 1608, while an inner end 1658 may be located on second mold portion 1618. Providing positive pressure and/or negative pressure at outer end 1653 of third passage 1652 and at outer end 1657 of fourth passage 1656 may result in a positive pressure and/or negative pressure at inner end 1654 of third passage 1652 and inner end 1658 of fourth passage 1656.

The mold halves of the embodiment shown in FIGS. 16-19 may be used to perform the method of making hemispherical cups discussed above with reference to FIGS. 1-9. When using the mold halves of the embodiment shown in FIGS. 16-19, positive and/or negative pressure may be applied to the patterned sheets. For example, when the patterned sheets are formed into hemispherical cups, air may be suctioned out of the mold halves through the passages to pull the sheets into the mold portions of the mold halves as the bladder expands.

FIG. 17 illustrates a hemispherical cup 1700 formed by first mold half 1606 and second mold half 1608. Hemispherical cup 1700 includes an inner side 1702 formed by a solid sheet and an outer side 1704 formed by a patterned sheet affixed to the solid sheet. In some embodiments, the solid sheet may only be used during the molding of the hemispherical cup. In such embodiments, the solid sheet may be removed before applying the patterned hemispherical cup to a golf ball. For example, as discussed below with reference to FIG. 21, the solid sheet may be peeled away from the hemispherical cup. In some embodiments, the solid sheet may be made of a material that dissolves. For instance, the solid sheet may dissolve with application of heat during the process of making hemispherical cups. In some embodiments, pressure and/or heat may transform the solid sheet into an adhesive to enhance adhesion between the hemispherical cup and the golf ball. In some embodiments, the solid sheet may include another layer of material on the finished golf ball. Thus, the solid sheet may remain as part of the hemispherical cup when the hemispherical cup is applied to a golf ball. For example, FIGS. 18-19 illustrate a first hemispherical cup 1800 and a second hemispherical cup 1802 being applied to the outer coating of a golf ball 1900. In some embodiments, the solid sheets may change the characteristics of golf ball 1900. For example, the solid sheets may form a layer improving the aerodynamics of the golf ball. In some embodiments, the solid sheets and patterned sheets may be bonded together by heat and/or pressure while the hemispherical cups are being formed. In some embodiments, as shown in FIG. 18, first hemispherical cup 1800 may remain in first mold half 1606 and second hemispherical cup 1802 may remain in second mold half 1608 after the hemispherical cups have been formed in the mold halves. In other embodiments, a different set of mold halves may be used to apply the hemispherical cups to the outer coating of a golf ball.

First mold half 1606 and second mold half 1608 or another set of mold halves may be used to apply the hemispherical cups to the outer coating of golf ball 1900 in the same manner discussed above with reference to FIGS. 10-11. For example, in some embodiments, first mold half 1606 and second mold half 1608 may be pressed together to apply the hemispherical cups to golf ball 1900, as shown in FIG. 19. In some embodiments, at any point during the application process, positive and/or negative pressure may be applied to the hemispherical cups. For example, negative pressure may be applied to the hemispherical cups when first mold half 1606 is moved toward second mold half 1608. This suction may hold first hemispherical cup 1800 in first mold half 1606 and a second hemispherical cup 1802 in second mold half 1608.

Figure 20:
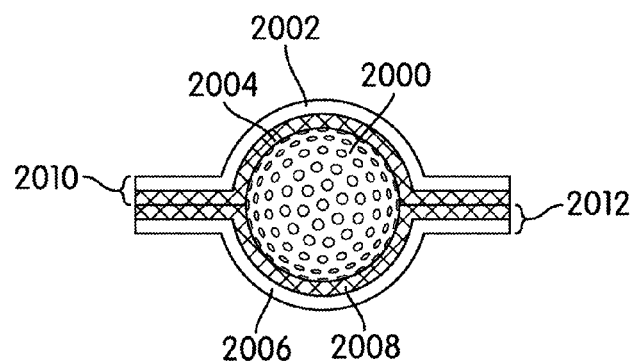
FIG. 20 shows a golf ball covered by hemispherical cups in which patterned sheets form an inner side and solid sheet form an outer side according to an exemplary embodiment.
Figure 21:
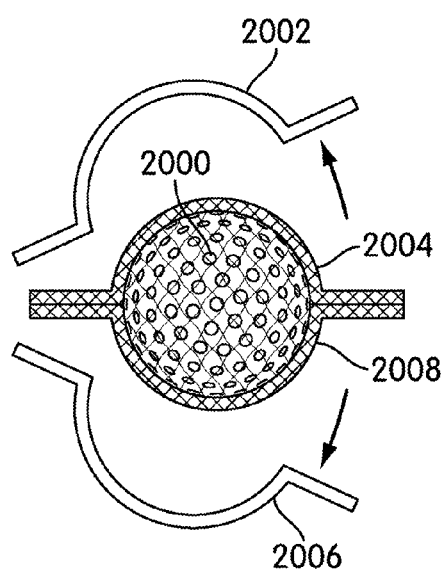
FIG. 21 shows the solid sheets of FIG. 20 being peeled away.

In some embodiments, instead of the solid sheet forming the inner side of the hemispherical cup, the solid sheet may form the outer side of the hemispherical sheet. For example, as shown in FIG. 20, a golf ball 2000 may be covered by a first hemispherical cup 2010 and a second hemispherical cup 2012. A solid sheet may form an outer side 2002 of first hemispherical cup 2010 and a patterned sheet may form an inner side 2004 of first hemispherical cup 2010. A solid sheet may form an outer side 2006 of second hemispherical cup 2012 and a patterned sheet may form an inner side 2008 of second hemispherical cup 2012. First hemispherical cup 2010 and second hemispherical cup 2012 may be applied to a golf ball 2000 by any of the disclosed methods. In some embodiments, the solid sheets remain on golf ball 2000 as another layer of material overlying the patterned layers. In some embodiments, as discussed above, the solid sheets may be transformed into an adhesive. In some embodiments, as discussed above, the solid sheets may be removed or dissolved. For example, as indicated by the arrows shown in FIG. 21, the solid sheets may be peeled away from the patterned layers after the hemispherical cups have been applied to the golf ball. In some embodiments, the solid sheets may be peeled away from the patterned layers before the hemispherical cups are applied to the golf ball.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of manufacturing a golf ball with a patterned layer, comprising:
   providing a golf ball, wherein the golf ball comprises a land area and a plurality of dimples;
   forming a pattern on a film material by removing portions of film from the film material;
   molding the film material with the pattern into substantially hemispherical cups of the film material with the pattern; and then
   applying the substantially hemispherical cups of the film material with the pattern to the land area of the golf ball to form the patterned layer, wherein the pattern on the film is aligned with the dimples of the golf ball.

2. The method according to claim 1, further comprising removing the portions of film with a die cutter.

3. The method according to claim 2, further comprising feeding the film material through a rotary die cutter.

4. The method according to claim 1, further comprising cutting sheets from the film material with the pattern.

5. The method according to claim 4, further comprising positioning the sheets of film material with the pattern between mold halves.

6. The method according to claim 5, further comprising positioning a bladder between the sheets of film material with the pattern while the sheets of film material with the pattern are positioned between the mold halves.

7. The method according to claim 6, further comprising molding the film material with the pattern into substantially hemispherical cups of the film material with the pattern by pressing the mold halves together and inflating the bladder between the sheets of film material with the pattern so that the bladder presses the sheets against mold portions of the mold halves.

8. The method according to claim 1, further comprising applying the substantially hemispherical cups of the film material with the pattern to the outer surface of a golf ball by positioning the substantially hemispherical cups of the film material with the pattern into mold halves and pressing a golf ball between the mold halves.

9. The method of claim 1, wherein the substantially hemispherical cups of the film material with the pattern form a patterned layer with a hardness different from the hardness of the outer surface of the golf ball.

10. A method of manufacturing a golf ball with a patterned layer, comprising:
    providing a golf ball, wherein the golf ball comprises a land area and a plurality of dimples;
    forming a pattern on a film material by removing portions of film from the film material in a pattern;
    molding the film material with the pattern into substantially hemispherical cups of the film material with the pattern by placing film material with the pattern between a first set of mold halves; and then applying the substantially hemispherical cups of the film material with the pattern to the land area of the golf ball to form the patterned layer, wherein the pattern on the film is aligned with the dimples of the golf ball.

11. The method according to claim 10, further comprising heating the first set of mold halves.

12. The method according to claim 10, further comprising disposing adhesive between the substantially hemispherical cups of the film material with the pattern and the outer surface of the golf ball.

13. The method according to claim 10, further comprising applying the substantially hemispherical cups of the film material with the pattern to the outer surface of the golf ball by positioning the substantially hemispherical cups of the film material with the pattern into a second set of mold halves, positioning the golf ball between the substantially hemispherical cups of the film material with the pattern, and pressing the second set of mold halves together.

14. The method according to claim 13, further comprising heating the second set of mold halves.

15. The method according to claim 10, further comprising unrolling the film material from a roll of film material.

16. The method according to claim 15, further comprising cutting sheets of film material.

17. The method of claim 10, wherein the substantially hemispherical cups of the film material with the pattern form a patterned layer with a hardness different from the hardness of the outer surface of the golf ball.

18. A method of manufacturing a golf ball with a patterned layer, comprising:
    providing a golf ball, wherein the golf ball comprises a land area and a plurality of dimples;
    forming a pattern on a film material by removing portions of film from the film material in a pattern;
    molding the film material with the pattern into substantially hemispherical cups of the film material with the pattern by placing film material with the pattern between a first set of mold halves, pressing the first set of mold halves together, and inflating a bladder between the first set of mold halves; and then
    applying the substantially hemispherical cups of the film material with the pattern to the land area of the golf ball, wherein the pattern on the film is aligned with the dimples of the golf ball.

19. The method according to claim 18, further comprising removing the portions of film with a die cutter.

20. The method according to claim 19, further comprising feeding the film material through a rotary die cutter.

21. The method according to claim 18, further comprising applying the substantially hemispherical cups of the film material with the pattern to the outer surface of the golf ball by positioning the substantially hemispherical cups of the film material with the pattern into a second set of mold halves, positioning the golf ball between the substantially hemispherical cups of the film material with the pattern, and pressing the second set of mold halves together.

22. The method according to claim 21, wherein the first set of mold halves and the second set of mold halves include substantially hemispherical shapes.

23. The method of claim 18, wherein the substantially hemispherical cups of the film material with the pattern form a patterned layer with a hardness different from the hardness of the outer surface of the golf ball.

* * * * *